Oct. 10, 1950

H. R. CUNINGHAM 2,525,652

SWIVEL JOINT

Filed Jan. 11, 1947

INVENTOR.
H. ROSS CUNINGHAM
BY
Benj. T. Rauber
his attorney

Oct. 10, 1950        H. R. CUNINGHAM        2,525,652
SWIVEL JOINT
Filed Jan. 11, 1947        2 Sheets-Sheet 2
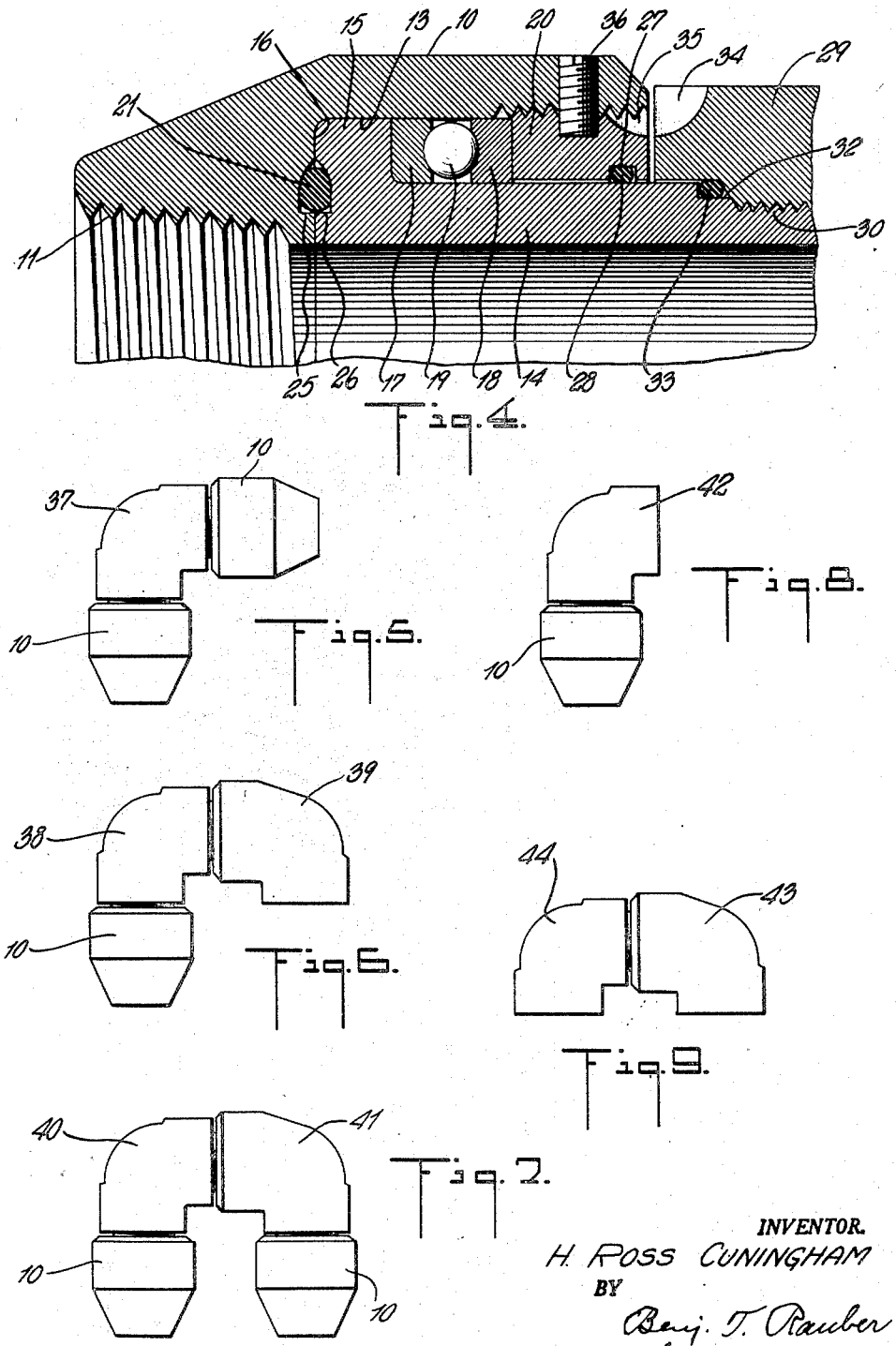
INVENTOR.
H. ROSS CUNINGHAM
BY
Benj. T. Rauber
his attorney

UNITED STATES PATENT OFFICE 2,525,652

SWIVEL JOINT

Hugh Ross Cuningham, Houston, Tex.

Application January 11, 1947, Serial No. 721,597

11 Claims. (Cl. 285—97.3)

My present invention relates to a swivel joint for connecting pipe in such a manner that they may rotate relative to each other on a common axis.

Joints of this type are commonly used in oil production for fluids under heavy pressure and containing suspended particles as, for example, for the fluid mud used in drilling operations. These fluids are supplied under very heavy pressure and the particles suspended have an abrasive character which would rapidly wear any bearings or other moving parts.

My present invention provides a joint or coupling having a frictionless or ball bearing between two relatively moving parts and a seal to prevent access of fluid from the interior of the joint to the bearings and also a seal to prevent access of grit or particle-bearing fluid from the outside.

In my present invention the ball bearing is received in a longitudinal recess of a pipe fitting and is positioned therein by an inner member having a flange which abuts the bottom of the recess and the inner surface immediately adjacent thereto and is otherwise of lesser diameter than the recess to form an annular space in which the ball bearing is placed.

The ball bearing is held tightly against the shoulder of the flange by means of a ring closely fitting the inner member and threaded into the recess which is provided with suitable internal threads for this purpose.

The inner member extends from the recess and receives a pipe fitting which abuts or is closely spaced from the recessed pipe fitting. The ball bearing thus serves to permit a relative and substantially frictionless rotation of the two pipe fittings on a common axis.

A fluid-tight seal is provided between the interior of the coupling and the ball bearing by providing an annular groove or grooves coaxial with the fitting between the end of the inner member and the bottom of the recess and containing a ring of resilient material which seals against the opposed sides of the groove. For this purpose the cross-sectional dimension of the ring, longitudinally of the fitting, is somewhat greater than the corresponding dimension of the groove so that it is slightly compressed and distorted to form a tight seal while still permitting relative rotation.

A seal is also provided between the inner member and the sealing ring and a resilient ring of a dimension to be compressed against the opposite surfaces of the groove. To seal the second pipe fitting onto the inner member the latter is threaded and provided with a recess which receives a ring of resilient material, and the pipe fitting has an extension which compresses and distorts this ring.

The various features of the invention are illustrated, by way of example, in the accompanying drawings in which Fig. 1 is a side view of a fitting embodying the invention;

Figs. 3 and 4 are sections similar to Fig. 2 of joints having modified forms of sealing ring, and Figs. 5 to 9 inclusive are side views on a smaller scale of various applications of the swivel joint.

Figure 1:
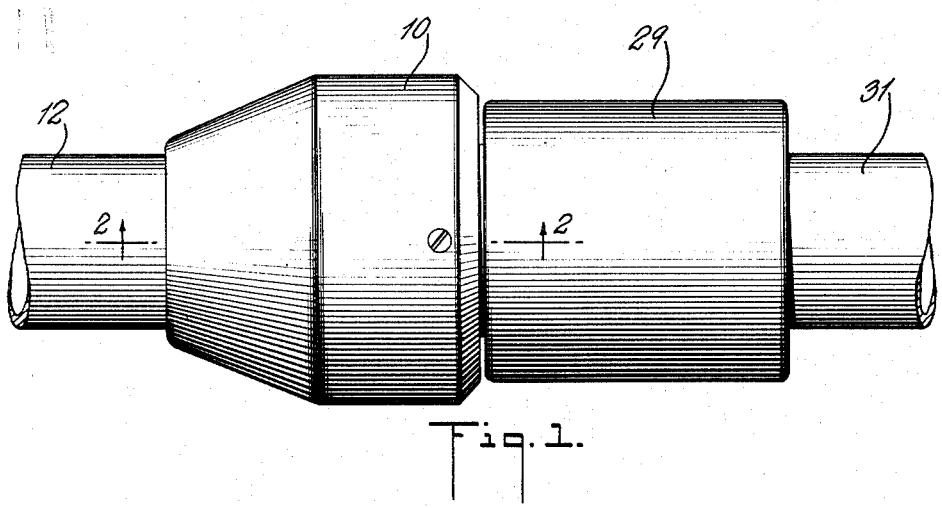
Figure 2:
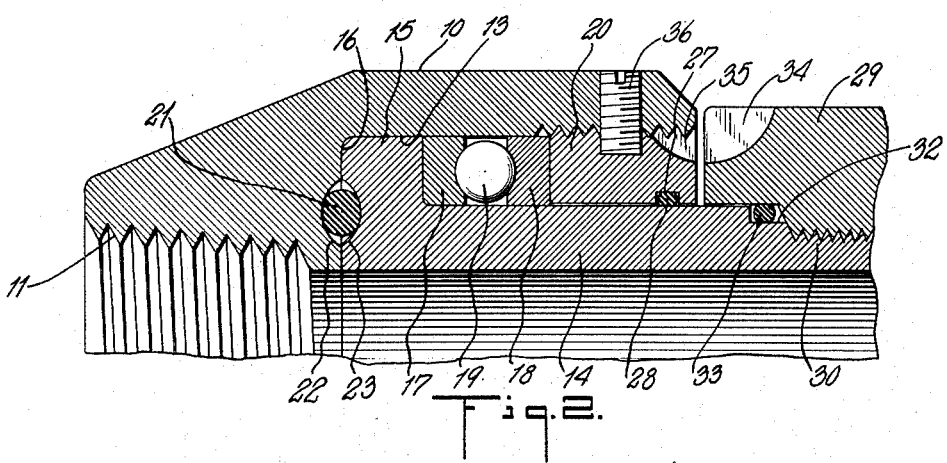
Fig. 2 is a longitudinal section on line 2—2 of Fig. 1 of a part of the joint.

In the embodiment of the invention illustrated in Figs. 1 and 2 the coupling comprises a pipe fitting 10 internally threaded at 11 to receive the end of a pipe 12 and provided with a longitudinal cylindrical recess 13 extending from the opposite end of the fitting. Mounted in the recess 13 and projecting from the open end thereof is a hollow inner member 14 of substantially cylindrical shape and having at the inner end a flange 15, the end of which abuts closely the bottom 16 of the recess and the outer circumference of which fits the circular wall of the recess 13.

The member 14 is of lesser diameter than the recess 13 to form an annular cylindrical space in which is received a ball bearing comprising raceways 17 and 18 and balls 19. The open end of the recess is then closed by a closing or sealing ring 20, the outer surface of which is threaded into internal threads of the recess near its open end.

The sealing ring 20 may be brought tightly against the raceway 18 and serves to securely confine the ball bearing between the end of the ring and the opposite face of the flange 15 thus holding all of the parts securely in position while permitting the coupling 10 and the inner member 14 to rotate freely on a common axis.

The raceways and balls of the ball bearing may be of hardened material providing good wearing qualities, and in case of breakage or wear may be easily replaced by unscrewing the closing ring 20.

To protect the ball bearing from leakage of fluid from the interior of the joint a sealing ring 21 of resilient material is provided between the end of the inner member 14 and the bottom 16 of the recess. This ring is received in an annular passageway, which in the form shown in Fig. 2 comprises a pair of complementary annular grooves 22 and 23, the depths of which are less than one-half their radial dimensions, so as to form, when assembled, an annular passageway of less dimensions in a longitudinal direction than in a radial direction.

The longitudinal dimension of this passageway is also somewhat less than the cross-sectional diameter of the ring 21 so that the latter is compressed and distorted to an elliptical cross-section or to one having flattened surfaces in contact with the surfaces of the grooves. In this way a tight seal is formed between the bottom 16 of the recess and the end of the inner member 14 which effectively prevents the passage of any fluid or solid while permitting free rotation of the respective elements.

Figure 3:
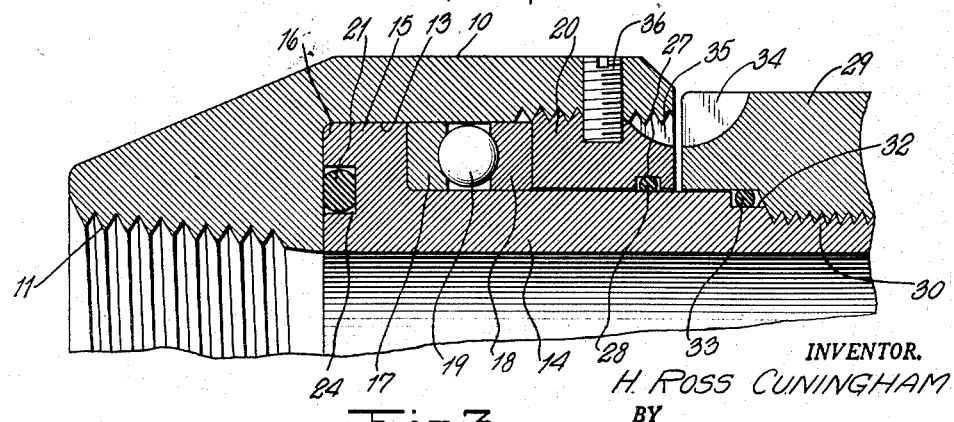

In the modification shown in Fig. 3 the annular passageway may be formed of a single groove 24 in the end of the inner member 14 and the ring 21 is compressed between the bottom of the groove 24 and the bottom 16 of the recess.

As shown in this modification also the groove is of rectangular cross-section of a greater dimension radially than longitudinally. The longitudinal dimension of the groove 24 is somewhat less than the cross-sectional diameter of the ring 21 so as to flatten the latter in a manner similar to that shown in Fig. 2.

In the modification shown in Fig. 4 the annular sealing passageway is formed of a pair of complementary grooves 25 and 26 in the bottom surface 16 and in the end of the inner member 14. The inner parts of the grooves 25 and 26 are rectangular in radial cross-section, and the outermost parts of the grooves are rounded to a tapering cross-section. In this case also the combined depth of the grooves is somewhat less than the cross-sectional diameter of the ring 21 so that the ring is slightly flattened. Any tendency of the ring to be distended outwardly would tend to still further flatten it against the converging walls of the grooves 25 and 26.

In each of the above modifications the ball bearing is protected against the inflow of fluid from within the coupling while being free to rotate as the coupling swivels.

To protect the ball bearing against the entrance of grit or fluid from outside of the swivel the sealing ring 20 is provided with an internal groove 27 circling the inner member 14, and a sealing ring 28 of resilient material of slightly greater cross-sectional diameter than the depth of the groove 27 is inserted in the groove so as to be slightly flattened between the outer surface of the inner member 14 and the bottom of the groove 27. This effectively seals the ball bearing from the access of fluid or grit from the outside.

To complete the joint a pipe fitting 29 is threaded onto the free end of the inner member 14 which is threaded at 30 for this purpose. The pipe fitting 29 may be provided with screw threads into which the end of a pipe 31 may be screwed. The threaded part 13 of the inner member 14 is of lesser diameter than the outer diameter of the inner member 14 which is provided with a groove 32 immediately adjacent the threaded part 30. The fitting 29 extends over the recess 32 and the end of the inner member 14 to a distance but slightly spaced from the fitting 10. In the groove 32 is placed a ring 33 of resilient material and of slightly less diameter than the depth of the groove so that it is flattened somewhat when the projecting part of the fitting 29 extends over the groove. This insures against any leakage between the inner member 14 and the fitting 29.

In assembling the swivel joint the ball bearing 17—19 is first slipped onto the inner member 14, the sealing ring 28 then placed in the groove 27 in the closing ring 13 and the assembly is then slipped onto the inner member 14 until it comes against the ball raceway 18. The sealing ring 33 is then placed onto the projecting end of the inner member and into the groove 32 and the fitting 29 is screwed tightly into position. The sealing ring 21 is then placed in position in either of the grooves 22 or 23 of the modification shown in Fig. 2, or the groove 24 of the modification shown in Fig. 3, or either of the grooves 25 or 26 of the modification shown in Fig. 4.

The bearings and working parts are packed with grease and the fitting 10 is then slipped over the inner member 14 and screwed onto the closing ring 20 to confine the ball bearing 17—19 in position.

The fitting 29 and the filling ring 20 are provided with slots 34, 35 respectively into which a blunt tool is inserted while the fitting 10 is being screwed onto the closing ring 20 and serves to hold the ring from turning. The fitting is screwed on to give just sufficient clearance between the flanged end of the inner member 14 and the bottom 16 of the recess to allow free movement of the two parts. The blunt tool used for holding the closing ring 20 in position is then removed and a set screw 36 is screwed through the fitting 10 and into the ring 20 to hold the latter from unscrewing. The coupling is then completed and may be screwed onto the ends of pipe that are to be connected. Such connections are illustrated by way of example in Figs. 5 to 9.

In Fig. 5 the fitting 29 is in the form of an elbow 37, both ends of which are provided with swivel joints.

In Fig. 6 the fitting 29 is an elbow 38 having a swivel joint at one end and an elbow 39 at the other end which may be a swivel or an ordinary elbow.

In Fig. 7 a pair of elbows 40 and 41 form parts of the swivel joint.

In Fig. 8 is illustrated a swivel joint having an elbow 42 which may be connected directly to a pipe or other fitting, and in Fig. 9 the member coresponding to the fitting 10 is shown as an elbow 43 while the member corresponding to the fitting 29 is an elbow 44.

These examples are merely to illustrate the various forms in which the swivel joint construction of my invention may be embodied or applied.

In the above construction a swivel joint is provided having two complementary parts rotatable relatively on a ball bearing or similar type of low friction bearing and in which the ball bearing is protected from access of fluids passing through the joint or from high pressure or from fluids or solids from outside of the coupling.

The sealing means is obtained by resilient contact of a sealing ring with the surfaces to be sealed, thus providing a fluid-tight seal while permitting the relative rotation of the parts.

Having described the invention, what I claim is:

1. A swivel joint which comprises an outer pipe fitting having a cylindrical recess extending longitudinally from one end of said fitting; an inner member extending into said recess to form an annular space and having an end flange abutting and filling the bottom of said recess; a ball bearing in said annular space; a closing ring threaded into said outer fitting to close said annular space and to hold said ball bearing against said flange; the bottom of said recess and the abutting flange having complementary circular grooves forming an annular passage having a greater dimension radially than longitudinally, and a ring of resilient material in said passage having a radial section of greater diameter than the longitudinal dimension of said recess and less than the radial dimension of said recess.

2. A swivel joint which comprises an outer pipe fitting having a cylindrical recess extending longitudinally from one end of said fitting; an inner member extending into said recess to form an annular space and having an end flange abutting and filling the bottom of said recess; a ball bearing in said annular space; a closing ring threaded into said outer fitting to close said annular space and to hold said ball bearing against said flange; the bottom of said recess and the abutting flange having complementary circular grooves forming an annular passage have a greater dimension radially than longitudinally; a ring of resilient material in said passage having a radial section of greater dimension than the longitudinal dimension of said recess and less than the radial dimension of said recess, and an annuar sealing ring of resilient material between said inner member and said closing ring.

3. A swivel joint which comprises an outer pipe fitting having a cylindrical recess extending longitudinally from one end of said fitting; an inner member extending into said recess to form an annular space and having an end flange abutting and filling the bottom of said recess; a ball bearing in said annular space; a closing ring threaded into said outer fitting to close said space and to hold said ball bearing against said flange; an annular pasage between opposing faces of said outer fitting and said inner member and having a longer dimension in the plane of said faces than transverse thereto, and a resilient ring in said passage of greater cross-sectional diameter than the smaller dimension of said passage.

4. The joint of claim 3 in which said passage and ring are in the opposing faces at the bottom of said recess and end of said inner member.

5. A swivel joint which comprises an outer pipe fitting having a cylindrical recess extending longitudinally from one end of said fitting; an inner member extending into said recess to form an annular space and having an end flange abutting and filling the bottom of said recess; a ball bearing in said annular space; a closing ring in said recess secured to said outer fitting to close said space and to hold said ball bearing against said flange and means to seal said ball bearing from the interior of said joint.

6. A swivel joint which comprises an outer pipe fitting having a cylindrical recess extending longitudinally from one end of said fitting; an inner member extending into said recess to form an annular space and having an end flange abutting and filling the bottom of said recess; a ball bearing in said annular space; a closing ring in said recess secured to said outer fitting to close said space and to hold said ball bearing against said flange; means to seal said ball bearing from the interior of said joint and means for sealing said ball bearing from the exterior of said joint.

7. A swivel joint which comprises an outer pipe fitting having a cylindrical recess extending longitudinally from one end; an inner member having an end abutting and filling the bottom of said recess and extending through and from said recess and of reduced outer dimension to form an annular space in said recess; a ball bearing in said space, a closing means in said space secured to said outer fitting and abutting the end of said inner member; means for sealing said space from the interior and exterior of said joint; a pipe fitting threaded onto the projecting end of said inner member and extending thereover to form an annular passage of a greater dimension longitudinally than radially and a resilient member in said passage and compressed between the cylindrical surfaces of said passage.

8. A swivel joint which comprises an outer pipe fitting having a cylindrical recess extending longitudinally from one end; an inner member in said recess having one end enlarged to fill and abut the bottom of said recess and of reduced diameter to form an annular space within said recess; a ball bearing in said annular space and abutting the enlarged end of said inner member; a closing ring in said recess and threaded into the outer pipe fitting to abut said ball bearing; means to seal said ball bearing from the interior and exterior of said joint; a connecting fitting threaded onto the projecting end of said inner member and projecting over the outer face thereof to approximately the end of said outer fitting and a resilient sealing ring compressed between said inner member and said connecting fitting.

9. A joint which comprises a member having a cylindrical outer surface and a threaded outer surface of lesser diameter than said cylindrical surface; an internally threaded outer member threaded onto said inner member and extending over said cylindrical outer surface thereof; said inner member having a groove of reduced diameter adjacent said cylindrical surface and a resilient sealing ring confined in said groove.

10. The joint of claim 1 having a recess in said closing ring and a resilient packing ring in said recess sealing said closing ring to said inner member.

11. The joint of claim 1 having a packing ring between said inner member and said closing ring and having a recess between said closing ring and said inner member to receive said packing ring.

HUGH ROSS CUNINGHAM.

REFERENCES CITED

The following references are of record in the file of this patent:

UNITED STATES PATENTS

| Number | Name | Date |
|---|---|---|
| 392,931 | Prindle | Nov. 13, 1888 |
| 2,238,535 | Meyer et al. | Apr. 15, 1941 |
| 2,346,051 | Seamark | Apr. 4, 1944 |
| 2,401,377 | Smith | June 4, 1946 |